US 9,411,441 B2

United States Patent
Pearce

(10) Patent No.: US 9,411,441 B2
(45) Date of Patent: Aug. 9, 2016

(54) INTERACTIVE WHITEBOARD FOR PRIVATE USE

(75) Inventor: Nigel Pearce, Lancashire (GB)

(73) Assignee: Promethean Limited (GB)

( * ) Notice: Subject to any disclaimer, the term of this patent is extended or adjusted under 35 U.S.C. 154(b) by 843 days.

(21) Appl. No.: 12/862,029

(22) Filed: Aug. 24, 2010

(65) Prior Publication Data

US 2011/0050611 A1 Mar. 3, 2011

(30) Foreign Application Priority Data

Aug. 25, 2009 (GB) .................................. 0914842.0

(51) Int. Cl.
G06F 3/038 (2013.01)
G06F 3/046 (2006.01)
G06F 3/0354 (2013.01)
G06F 3/041 (2006.01)
G06F 9/44 (2006.01)

(52) U.S. Cl.
CPC ............ *G06F 3/038* (2013.01); *G06F 3/03545* (2013.01); *G06F 3/046* (2013.01); *G06F 3/0416* (2013.01); *G06F 9/4443* (2013.01)

(58) Field of Classification Search
CPC .............. G06F 3/0488; G06F 3/04883; G06F 3/04886; G06F 3/038; G06F 3/0416; G06F 3/046; G06F 3/03545; G06F 9/4443; G06F 2203/04101
USPC ...................... 345/1.1, 1.2, 1.3, 2.1, 2.3, 173, 345/156–158, 163, 166, 168, 174, 179; 715/733–747, 751, 759
See application file for complete search history.

(56) References Cited

U.S. PATENT DOCUMENTS 5,252,951 A * 10/1993 Tannenbaum et al. ........ 345/156
2004/0189706 A1 * 9/2004 Ieperen .......................... 345/773

(Continued)

FOREIGN PATENT DOCUMENTS

EP           1049066 A2     11/2000
WO      WO 99/31571 A1      6/1999

(Continued)

OTHER PUBLICATIONS

Combined Search and Examination Report prepared by the United Kingdom Intellectual Property Office for Application No. GB0914842.0 on Dec. 15, 2009.

(Continued)

*Primary Examiner* — Aneeta Yodichkas
*Assistant Examiner* — Saifeldin Elnafia
(74) *Attorney, Agent, or Firm* — Brient Globerman, LLC; Kyle M. Globerman

(57) ABSTRACT

A method of controlling a computer system is disclosed. The computer system is adapted to receive inputs from an interactive display surface and one or more other input devices. The computer system is further adapted to display images on the interactive display surface and a further display surface. The interactive display surface and the further display surface forms a contiguous desktop display for the computer system. The method includes receiving input data from the one or more input devices, where a foreground application is determined in dependence upon the input data from the one or more input devices and receiving input data from the interactive display surface, where the input data from the interactive display surface does not affect the determination of the foreground application.

19 Claims, 5 Drawing Sheets

(56) References Cited

U.S. PATENT DOCUMENTS

2007/0294632 A1 12/2007 Toyama
2009/0102744 A1* 4/2009 Ram .............................. 345/1.1

FOREIGN PATENT DOCUMENTS

| WO | 0052566 | A1 | 9/2000 |
| WO | WO 02/93542 | A1 | 5/2002 |

OTHER PUBLICATIONS

Extended European Search Report, dated Sep. 16, 2014, from corresponding European Application No. EP10173671.8, filed Aug. 23, 2010.

* cited by examiner

INTERACTIVE WHITEBOARD FOR PRIVATE USE

BACKGROUND TO THE INVENTION

1. Field of the Invention

The present invention relates to an interactive display system in which a computer system is adapted to receive inputs from an interactive display surface and a mouse, and to generate output graphic signals for display on the interactive display surface and a further display associated with a computer system, the graphic output signals being generated to the respective displays through respective display drivers, the interactive display surface and the further display forming a contiguous desktop area for the computer system.

2. Description of the Related Art

A typical example of an interactive display system is an electronic whiteboard system. An electronic whiteboard system typically is adapted to sense the position of a pointing device or pointer relative to a work surface (the display surface) of the whiteboard, the work surface being an interactive surface. When an image is displayed on the work surface of the whiteboard, and its position calibrated, the pointer can be used in the same way as a computer mouse to manipulate objects on the display by moving a pointer over the surface of the whiteboard.

A typical application of an interactive whiteboard system is in a teaching environment. The use of interactive whiteboard systems improve teaching productivity and also improve student comprehension. Such whiteboards also allow use to be made of good quality digital teaching materials, and allow data to be manipulated and presented using audio visual technologies.

A typical construction of an electronic whiteboard system comprises an interactive display forming the electronic whiteboard, a projector for projecting images onto the display, and a computer system in communication with the electronic whiteboard for generating the images for projection, running software applications associated with such images, and for processing data received from the display associated with pointer activity, such as the location of the pointer on the display surface. In this way the computer system can control the generation of images to take into account the detected movement of the pointer on the interactive surface.

The computer system is also typically provided with a dedicated display associated with the computer system itself. This display may, for example, be the display of a desktop computer, or the display of a laptop computer. In prior art interactive whiteboard systems, the image is displayed onto the interactive display surface of the interactive whiteboard while also displayed on the further display associated with the computer system itself.

In more recent computer systems, there is provided graphics hardware comprising multiple graphics outputs for a single computer. With a computer system with two graphics outputs, this allows for the projector associated with the interactive display system to be connected to receive graphics data from one graphics output of the computer system, and the further display associated with the computer system to be connected to receive graphics data from the other graphics output of the computer system. In such an arrangement, as one skilled in the art will understand, the interactive display surface and the display of the computer system form a contiguous desktop area for a user of the computer system. Different images may be displayed on each of the displays, but the control of such images is controlled by a single computer. The mouse may be moved across both display areas.

The use of such a computer system with dual output graphics hardware allows for a user of the computer system having control of the mouse to operate software applications which are displayed on the monitor of the computer system, whilst one or more users may work at the surface of the interactive whiteboard, with one or more pointing devices, to control software applications displayed on the interactive display surface. Such an operation of an interactive display system would be particularly advantageous in education environments, where a teacher may run applications on the display of the computer system, for example preparing lessons or marking students' work, while the students perform educational tasks using applications running on the interactive display surface at the interactive display.

However a problem arises insofar as the users of the pointing devices at the interactive surface generate mouse data as a result of the inputs at the interactive display surface, which interfere with the interaction of the user of the computer system using the mouse to control applications running on the computer monitor. This inhibits the usefulness of running applications on the computer system using the display of the computer system whilst other individuals are running applications on the interactive whiteboard.

It is an object of the invention to provide an improved arrangement to allow the simultaneous operation of applications at the interactive display surface and on a separate further display, under the control of a single computer system, such that a user using the mouse may control an application displayed on the display of the computer system, whilst a user using a pointing device controls an application which is displayed on the interactive surface.

SUMMARY OF THE INVENTION

In one aspect the invention provides a method of controlling a computer system, which computer system is adapted to receive inputs from an interactive display surface and one or more other input devices, the computer system being further adapted to display images on the interactive display surface and a further display, the interactive display surface and the further display forming a contiguous desktop display for the computer system, the method comprising: receiving input data from the one or more input devices, wherein a foreground application is determined in dependence upon the input data from the one or more input devices; receiving input data from the interactive display surface, wherein the input data from the interactive display surface does not affect the determination of the foreground application.

In one aspect the invention provides a method of controlling a computer system, which computer system is adapted to receive inputs from an interactive display surface and one or more other input devices, the computer system being further adapted to display images on the interactive display surface and a further display, the interactive display surface and the further display forming a contiguous desktop display for the computer system, the method comprising: receiving input data from the one or more input devices, and from the interactive display surface, and determining the foreground application only in dependence on the input data from the one or more input devices.

In one aspect the invention provides a method of controlling a computer system, which computer system is adapted to receive inputs from an interactive display surface and one or more other input devices, the computer system being further adapted to display images on the interactive display surface and a further display, the interactive display surface and the further display forming a contiguous desktop display for the computer system, the method comprising: receiving input data from one or more input devices and from the interactive display surface, and determining an application having the input focus only in dependence on the input data from the one or more input devices.

An area in which a user is directing input may be determined to have the input focus if such input is provided using one or more further devices. Preferably, an area on the interactive surface cannot be determined to have the input focus responsive to an input at the interactive surface.

The method may further comprise routing the input data from the interactive display surface to one or more applications. The step of routing the data received from the interactive display surface may comprise converting the data into a proprietary format. The one or more applications may be adapted to process the data in the proprietary format. Any application receiving data from the interactive display surface is maintained as a background application. The one or more images displayed on the interactive display surface may be associated with the one or more applications.

The input data from the interactive display surface is preferably thereby prevented from interrupting the input data received from the one or more input devices.

An input focus of the computer system is preferably thereby unaffected by the input data from the interactive display system.

The method may further comprise controlling the one or more background applications using the interactive display surface.

The method may further comprise routing the input data from the one or more input devices to one or more possible foreground applications. The one or more images displayed on the interactive display surface may be associated with the one or more possible foreground applications. The one of the one or more possible foreground applications with which the input data from the one or more input devices may be associated may be determined to be the foreground application.

In an embodiment the invention provides a method of controlling a computer system, which computer system is adapted to receive inputs from an interactive display surface and one or more other input devices, the computer system being further adapted to display images on the interactive display surface and a further display surface, the interactive display surface and the further display surface forming a contiguous desktop display for the computer system, wherein images associated with a one or more applications are displayed on the interactive display surface, and images associated with one or more possible foreground applications are displayed on the further display, wherein the one or more images displayed on the interactive display surface are controlled by the inputs from the interactive display surface, and the one or more images displayed on the further display are controlled by inputs from the one or more further input devices, the method comprising: receiving input data from the one or more input devices, wherein a foreground application is determined in dependence upon the input data from the one or more input devices; receiving input data from the interactive display surface, wherein the input data from the interactive display surface does not affect the determination of the foreground application.

Thus a set of applications for display on the further display comprise one or more applications which collectively retain the input focus of an operating system running on the computer, with one of said set of application having the input focus at any one time. The one of the set of applications having the input focus is the foreground application.

A set of applications for display on the interactive display surface comprise one or more applications which collectively cannot gain the input focus of the operating system running on the computer in dependence on inputs from the interactive display surface. Thus whilst an application which is already determined to be a foreground application may receive inputs from the interactive display surface, a background application cannot switch to a foreground application in dependence on input data from the interactive display surface.

The invention further provides a computer program for performing, when run on a computer, the method steps as defined. The invention still further provides a computer program product for storing a computer program code which, when run on a computer system, performs any method step as defined.

In another aspect there is provided a computer system adapted to display one or more images on an interactive display surface and to display one or more images on a further display, the computer system being further adapted to receive inputs from the interactive display surface and from one or more further input devices, the computer system further comprising: means for determining a foreground application in dependence upon the input data received from the one or more further input devices, wherein said means is adapted to make said determination independent of the input data received from the interactive display surface.

In another aspect there is provided a computer system adapted to display one or more images on an interactive display surface and to display one or more images on a further display, the computer system being further adapted to receive inputs from the interactive display surface and from one or more further input devices, the computer system further comprising: means for determining a foreground application in dependence only on the inputs received from the one or more further input devices.

In another aspect there is provided a computer system adapted to display one or more images on an interactive display surface and to display one or more images on a further display, the computer system being further adapted to receive inputs from the interactive display surface and from one or more further input devices, the computer system further comprising: means for determining an application having the input focus in dependence only on the inputs received from the one or more further input devices.

The computer system may further comprise means for routing the input data from the interactive display surface to one or more applications. The means for routing the data received from the interactive display surface may include means for converting the data into a proprietary format. The one or more applications may be adapted to process the proprietary data. The computer system may be further adapted such that any background application receiving data from the interactive display surface is maintained as a background application. Any foreground application receiving data from the interactive display surface is maintained as a foreground application. The computer system may be further adapted such that one or more images displayed on the interactive display surface are associated with the one or more applications. The computer system may be further adapted such that the input data from the interactive display surface is prevented from interrupting the input data received from the one or more input devices. The computer system may be further adapted such that an input focus of the computer system is unaffected by the input data from the interactive display system. The computer system may further comprise means for controlling the one or more applications displayed on the interactive display surface using the interactive display surface.

The computer system may further comprise means for routing the input data from the one or more input devices to one or more possible foreground applications. The computer system may further be adapted such that one or more images displayed on the further display are associated with the one or more possible foreground applications. The computer system may further be adapted such that the one of the one or more possible foreground applications with which the input data from the one or more input devices is associated is determined to be the foreground application.

The interactive display surface may be a display surface of a projection system. The further display may be a display of the computer system. There may further be provided a pointing device, the interactive display surface being adapted to detect the presence and position of the pointing device on the interactive surface. The interactive display surface may be a touch sensitive surface and the pointing device is a finger. The interactive display surface may be an electromagnetic surface and the pointing device is an electromagnetic pointing device. The interactive display surface may be adapted to control a first set of software applications. The one or more further input devices may be adapted to control a second set of software applications.

The invention further comprises an interactive display system including a computer system as defined.

BRIEF DESCRIPTION OF THE FIGURES

The invention will now be described by way of example with reference to the accompanying figures, in which.

DESCRIPTION OF THE PREFERRED EMBODIMENTS

The invention is now described by way of reference to various examples, embodiments, and advantageous applications. One skilled in the art will appreciate that the invention is not limited to the details of any described example, embodiment or detail. In particular the invention is described with reference to an exemplary interactive display system. One skilled in the art will appreciate that the principles of the invention are not limited to such a described system.

Figure 1:
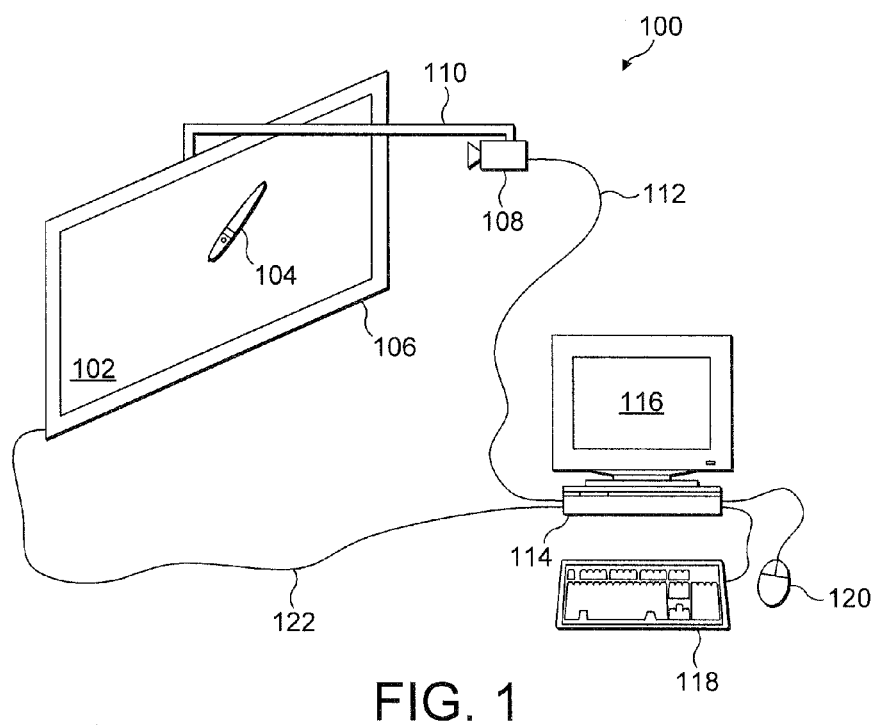
FIG. 1 illustrates the main elements of a typical known example interactive display system.

With reference to FIG. 1, an exemplary interactive display system 100 comprises: a whiteboard assembly arrangement generally designated by reference numeral 106, and including an interactive display surface 102; a projector 108, and a computer system 114. The projector 108 is attached to a fixed arm or boom 110, which extends in a direction perpendicularly from the surface of the whiteboard 106. One end of the boom 110 supports the projector 108 in a position in front of the display surface 102, and the other end of the boom 110 is fixed to the whiteboard 106 or near the whiteboard, such as a frame associated with the whiteboard 106, or a wall on which the whiteboard 106 is mounted.

The computer 114 controls the interactive display system. A computer display 116 is associated with the computer 114. The computer 114 is additionally provided with a keyboard input device 118 and a mouse input device 120. The computer 114 is connected to the whiteboard 106 by communication line 122 to receive input data from the display surface 102, and is connected to the projector 108 by a communication link 112 in order to provide display images to the projector 108. Although in FIG. 1 these are shown as wired connections, they also may be implemented as wireless connections.

Shown in FIG. 1 is a pointing device 104, which is used to provide inputs at the display surface 102. In other interactive display systems the display surface 102 may be touch-sensitive surface, and inputs provided at the interactive display surface by touch using a finger. Various technologies exist for detecting the position of a pointing device (such as a pen or finger) at the interactive surface, which additionally include camera position detection technology. The invention encompasses all such technologies and is generally applicable to interactive surfaces.

As is known in the art, the computer 114 controls the interactive display system to project images via the projector 108 onto the interactive display surface 102. The position of the pointing device 104 is detected by the interactive display surface 102, data returned to the computer 114, and location information determined by the computer 114. The pointing device 104 operates in the same way as a mouse to control the displayed images.

In accordance with embodiments of the invention, the computer system 114 is provided with a display driver incorporating graphics hardware to provide multiple graphics outputs, such that the display graphics data may be transmitted to the projector 108 for display on the interactive display surface, and separately to the display 116 of the computer system 114. Thus different images may be displayed on the two displays under the control of a computer system. In such a computer system environment, which is known in the art, the two display surfaces form a contiguous desktop area. The mouse 120 may be used to control applications which are displayed on either the display 116 or the interactive display surface 102. The pointing device 104 may be used to control applications which are displayed on the interactive display surface 102. A user of the computer system 114, having control of the mouse 120, has overall control of the computer system including the displayed images and applications running on the interactive display surface 102.

In the following description, it is assumed that the interactive display system is deployed in an educational environment. In such an environment, the teacher has control of the mouse 120 and the keyboard 118 in order to have overall control of the interactive display system. A teacher may also use the pointing device 104. However in the embodiments described herein it is assumed that a student has control of the pointing device 104. It is also envisaged that a plurality of pointing devices such as pointing device 104 may be provided, which may be used on the interactive surface 102 simultaneously by a number of different students.

It will be understood by one skilled in the art, however, that the invention and its embodiments are not limited to application in an educational environment. One skilled in the art will envisage other possible applications.

It is assumed in the following discussion that the teacher has set up one or more applications running on the computer system 114 for display on the interactive display surface 102, for interaction of such applications with students using the pointing device 104. Simultaneously, the teacher has set up the computer system 114 to run a separate application which is displayed only on the display 116 of the computer system, which the teacher controls using the mouse 120.

The operation of the computer 114 in accordance with a prior art arrangement is now described with reference to FIG. 2.

Figure 2:
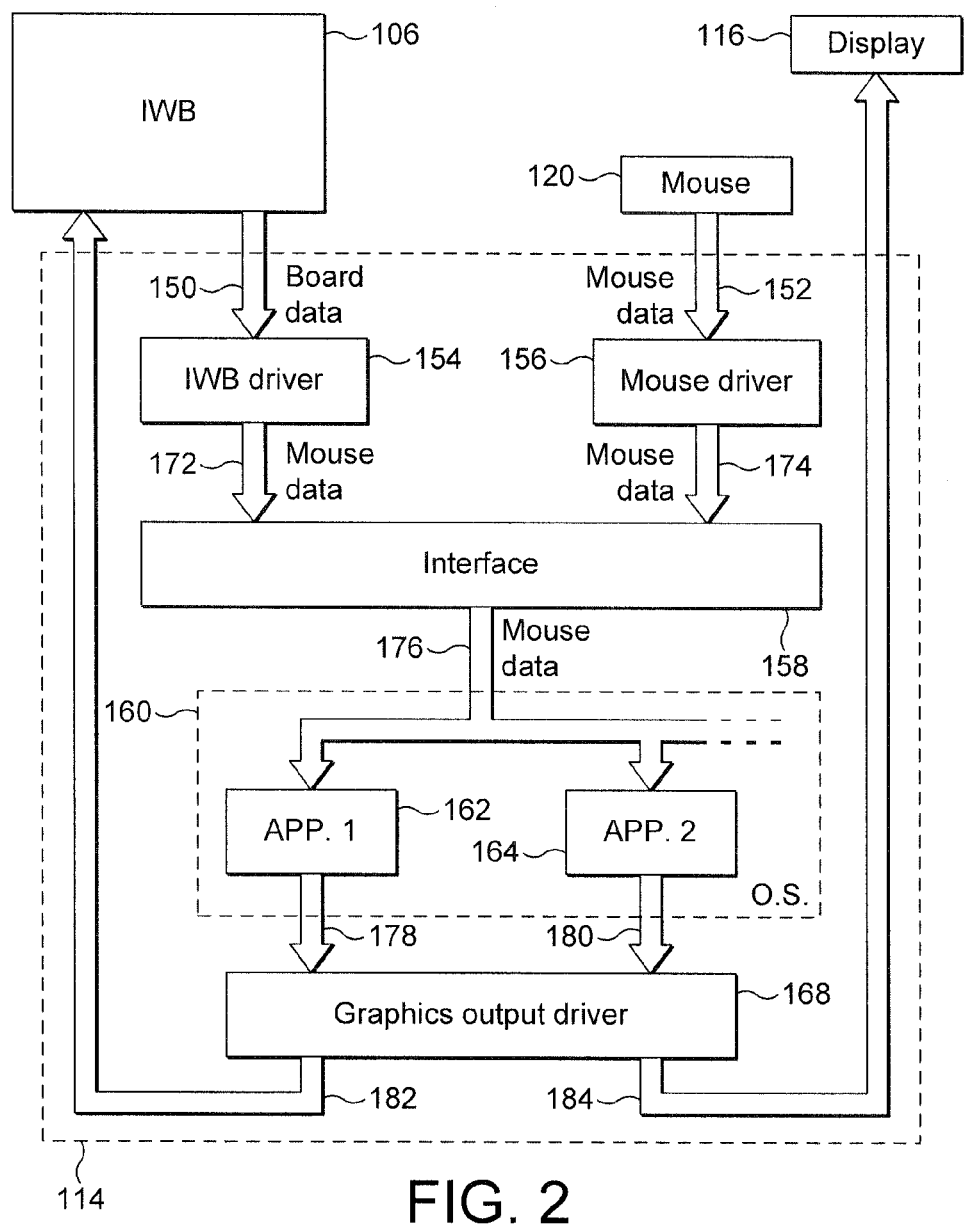
FIG. 2 illustrates the functional blocks for processing input data in a conventional interactive display system.

As is illustrated in FIG. 2, the computer system 114 includes an interactive whiteboard driver 154, a mouse driver 156, an interface 158, and a graphics output driver 168. An operating system of the computer system 114 is generally designated by reference numeral 160, and includes a first application (application 1) 162 and a second application (application 2) 164. One skilled in the art will appreciate that the representation of FIG. 2 is for illustrative purposes and understanding the invention only. Other functional elements will be required to fully implement the computer system and to support operation of the interactive display system. Further, the block 160 representing the operating system is illustrative, and the blocks 162 and 164 representing applications are illustrative. For the purpose of this description it is assumed that the applications are controlled in the operating system, and are represented as distinct blocks for the purpose of illustrating the delivery of data to those applications.

The interactive whiteboard driver 154 receives so-called board data on a data bus 150 from the interactive whiteboard 106. The board data on the data bus 150 is the input data received at the interactive display surface of the interactive whiteboard 106. The mouse driver 156 receives so-called mouse data on a data bus 152 from the mouse 120.

In accordance with prior art techniques, the interactive whiteboard driver 154 is adapted to convert the board data on data bus 150 into a mouse data format. Thus the interactive whiteboard driver 154 provides mouse data on a data bus 172. The mouse driver 156 similarly provides the mouse data on its input data bus 152 as mouse data on an output data bus 174. The mouse data on data buses 172 and 174 from the interactive whiteboard driver 154 and mouse driver 156 are provided as inputs to an interface block 158.

The interface block 158 represents the interfacing of mouse data to the operating system. The interface 158 operates to interleave or multiplex the mouse data received on various data buses, such as the data buses 172 and 174, onto a single data bus 176 for delivery to the operating system. As illustrated in FIG. 2, the mouse data on data bus 176 is delivered to the operating system 160, which constitutes delivering the mouse data to all applications running within the operating system 160. Thus the first application 162 and second application 164 receive the mouse data on data bus 176.

The first application 162, being displayed on the display surface of the interactive whiteboard 106, is connected to deliver display data on a data bus 178 to the graphics output driver 168, which provides the display data on data bus 182 to the interactive whiteboard 106 at a first graphics output thereof.

The second application 164 is displayed on the display 116, and is adapted to provide display graphics data on a data bus 180 to the graphics output driver 168, which in turn generates graphics data on data bus 184 for delivery to the display 116 at a second graphics output thereof.

It will be apparent to one skilled in the art that the functional blocks of FIG. 2 operate under the control of a controller, such as a processor of the computer system 114. The computer system controller will receive data generated by the applications running under the operating system, and determine where to route such data for display in accordance with knowledge as to which display an application that data is associated with is currently being displayed on. Thus the routing of data from the first and second applications on data buses 178 and 180 is simply for illustrative purposes, and additional interfaces may be provided in order to route such data. The invention is not concerned with the delivery of data from the various applications to the graphics output driver, or delivery of the data from the graphics output driver to the actual displays.

As can be seen in FIG. 2, the interactive whiteboard driver 154 is generally set up to convert data received from the board into mouse data. This is then delivered with the mouse data from the mouse 120 to the operating system 160 and any applications running within the operating system. Thus data received from the interactive whiteboard 106, which is as a result of a student using a pointing device on the surface of the interactive whiteboard 106, is received by the operating system 160 as mouse data when delivered to the first application 162. As this is mouse data, then the first application takes control of the "input focus" of the operating system in order to process this data. This means that the second application 164 is interrupted in order for the first application to process the mouse data to update its status.

It can be understood that as a result the second application, displayed on the display 116 under the control of the mouse 120 which in turn is under the control of the teacher, is interrupted whenever data is received from the interactive whiteboard 106. In practice, on the assumption that the interactive whiteboard 106 is being used by students to carry out an educational task, the operation of the second application will be continually interrupted, as the input focus of the operating system switches to the first application to process the mouse data generated as a result of inputs from the interactive whiteboard.

The term 'input focus' is known in the art to refer to the application running on a computer under the control of the operating system which currently has the focus of the operating system. As known in the art, the input focus switches from one application to another as inputs are received which are associated with different applications. In general, an area having the input focus is an area in which a user is currently directing input.

Applications running on a computer under the control of an operating system can be termed 'foreground' applications and 'background' applications, which terms are well-known in the art. A foreground application is an application which currently has the input focus, and a background application is one which does not.

As known in the art, as the input focus switches between applications in accordance with the area in which a user is currently directing input changing, inputs to other applications may be interrupted or stopped. Only one application can have the input focus at any time, and thus only one application can be the foreground application at any time.

Figure 3:
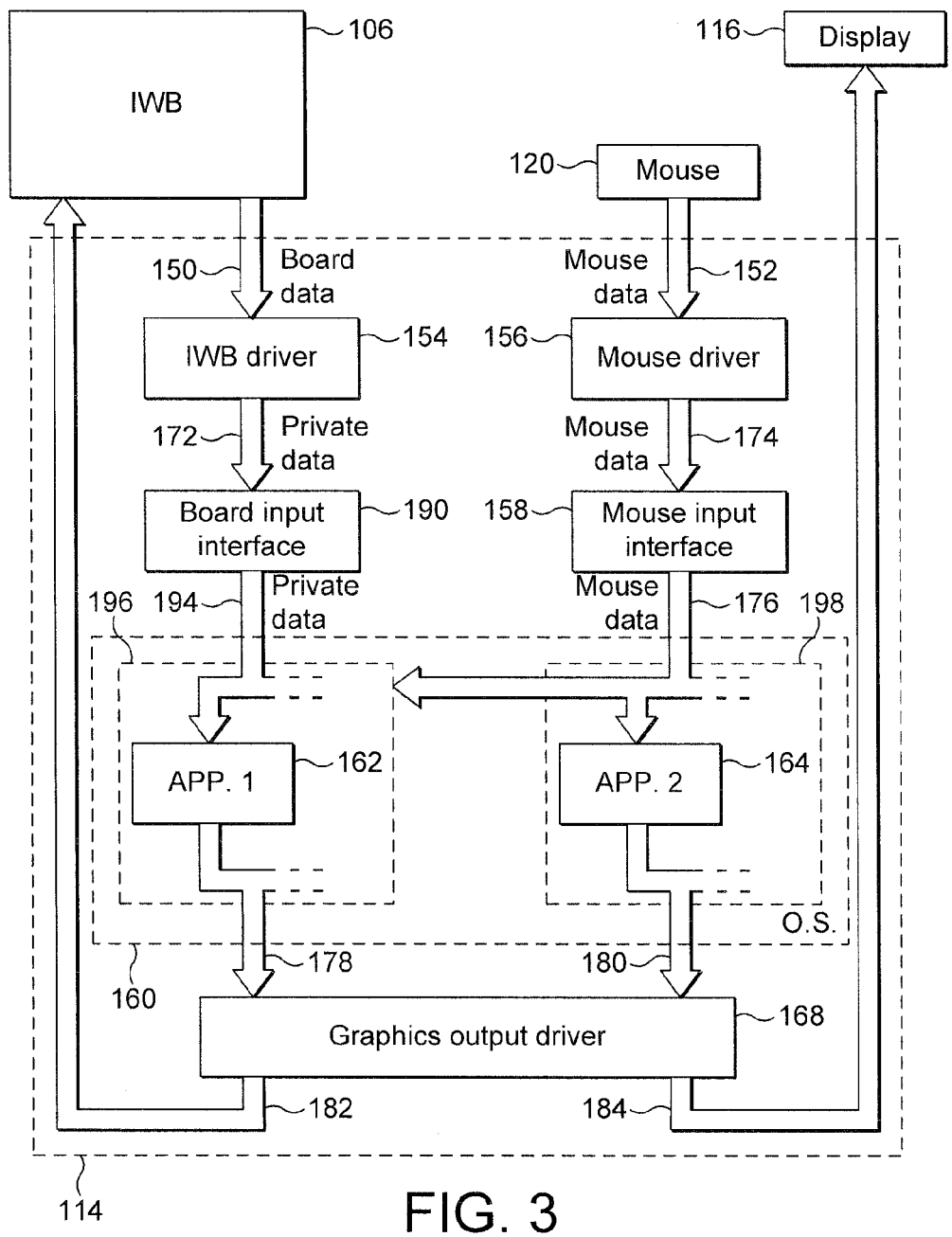
FIG. 3 illustrates the functional blocks for processing input data in an interactive display system adapted in accordance with an embodiment of the invention.

With reference to FIG. 3, there is illustrated an adapted computer system 114 to address the problem of the inputs focus of the second application being interrupted whilst input data for the first application is processed. In FIG. 3, and generally in the Figures, where an element shown in one Figure corresponds to an element shown in another Figure, like reference numerals are used to denote such elements.

With reference to FIG. 3, and in comparison to FIG. 2, the interactive whiteboard driver 154 is adapted to convert the board data 150 into a proprietary format on data bus 192, such that the data is termed "private data". The private data on data bus 192 is delivered to a board input interface 190. The board input interface 190 delivers the private data on a private data bus 194 to the operating system 160. As in the prior art arrangement of FIG. 2, the mouse data retrieved from the mouse 120 via the mouse driver 156 is delivered on the mouse data bus 176 by the mouse input interface 158. It will be understood by one skilled in the art that there may be additional inputs provided at the computer system 114 which provide additional mouse data, which mouse data will also be received by the mouse input interface 158 for presentation on the mouse data bus 176 to the operating system.

As illustrated in FIG. 3, applications running under the control of the computer system 114 can be generally allocated into one of two groups. A first set of applications can be grouped into a group denoted by dash block 196, and a second set of applications can be grouped into a group denoted by dash block 198. In the example of FIG. 3, the first application 162 is shown as part of the first group of applications 196, and a second application 164 is shown as part of the group of second applications 198.

As illustrated in FIG. 3, the applications in the first group 196 receive data on the private data bus 194. The applications in the second group 198 receive data on the mouse data bus 176. Additionally, data on the mouse data bus 176 is delivered to the first set of applications 196.

The first set of applications 196 includes applications, such as the first application 162, which are adapted to be responsive to the data on the private data bus 194. In practice, the data on the private data bus 194 may be broadcast to all applications, including the applications included within the second group 198, but only those applications which are adapted to use the private data will recognise the private data and process it. Alternatively, applications in the first group of applications 196 may register with the board input interface 190, and the private data on the private data bus 194 may include the identifiers or addresses of the applications of the first group of applications 196, such that that data is specifically addressed to those applications. Thus it will be understood that the identification of the groups 196 and 198 does not necessarily denote a demarcation between the applications, with the private data bus 194 being only connected to a certain set of applications. The arrangement of FIG. 3 denotes the data flow, rather than the establishment of physical channels between the board input interface 190 and the applications within the operating system. Still further, in an alternative implementation, the board input interface 190 may be implemented as part of the mouse input interface 158, all data, both mouse data and private data, being transmitted on the data bus 176, but with the data packets being modified to indicate whether the data in a given packet is either mouse data or private data, so that the applications receiving all data can process the data packets or ignore the data packets accordingly.

As noted in FIG. 3 the applications contained within the first set of applications 196, in addition to receiving the data on the private data bus 194, also receive the data on the mouse data bus 176. The mouse 120 retains overall control of the computer system 114, and therefore if a mouse event is associated with one of the applications contained within the first group 196 then the mouse data is accordingly addressed to that application, and received by the application on the mouse data bus 176. Thus the applications contained within the first set of applications 196 are arranged to receive the data on the private data bus 194 and the data on the mouse data bus 176, whereas the applications within the second group of applications 198 is arranged only to receive the data on the mouse data bus 176. As noted above, the applications within the second group of applications 198 may in fact receive the private data, but ignore it.

In this way, as the data delivered to the applications within the first group of applications 196 is private data, and not mouse data, the input focus of the operating system is retained by the control of the applications within the second group of applications 198. The input data received from the interactive whiteboard 106, associated with applications which are being displayed on the interactive whiteboard surface, do not interrupt or interfere in any way with the applications which are running and being displayed on the display 116.

As further illustrated in FIG. 3 the graphics outputs associated with the applications within the first group of applications 196, including the first application 162, are output on graphics data bus 178 to the graphics output driver 168. The graphics outputs associated with the second group of applications 198 including the second application 164 are output on the graphics bus 180 to the graphics output driver 168.

Figure 4:
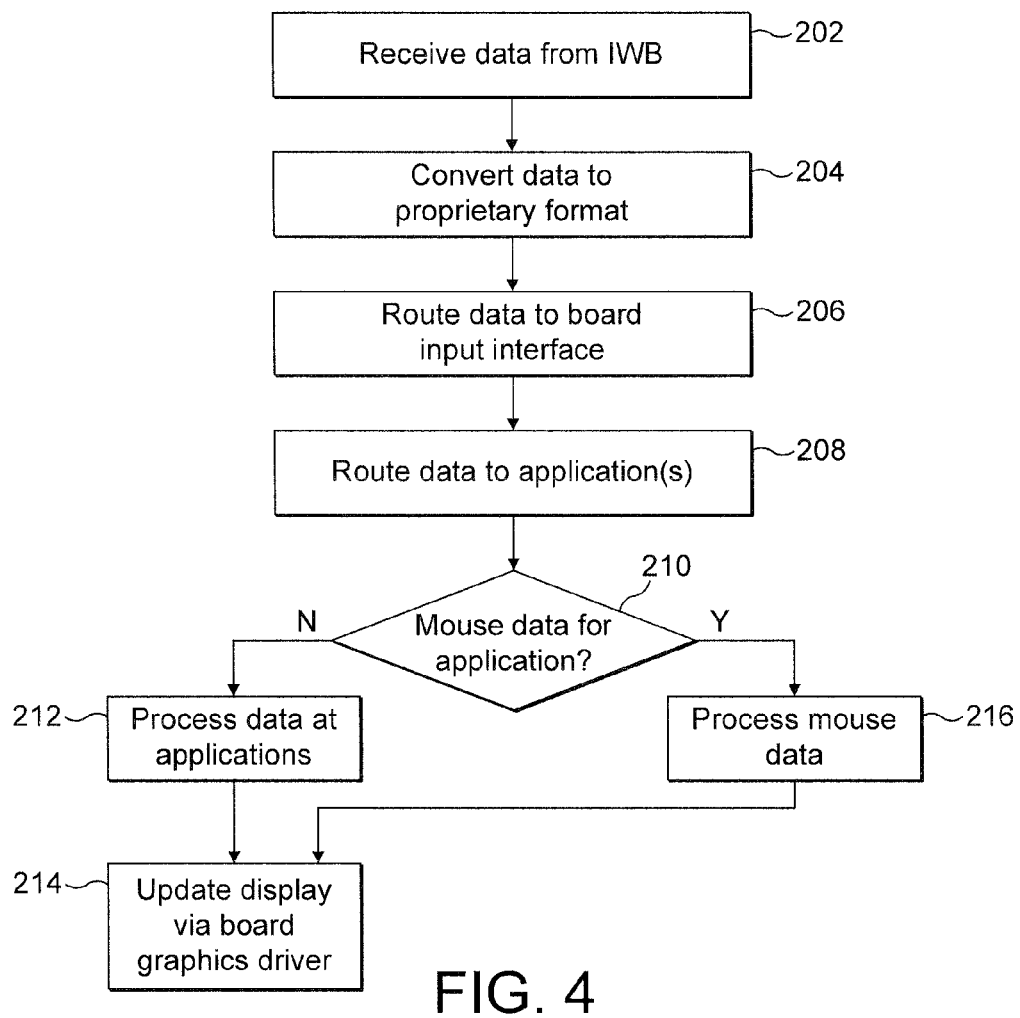
FIG. 4 illustrates the processing of input data received from the interactive display surface in accordance with a preferred embodiment of the invention.

With reference to FIG. 4 there is now illustrated the process steps involved in processing input data received at the interactive display 106, for controlling or updating applications which are running on the interactive whiteboard.

In a step 202 data is received from the interactive whiteboard, at the interactive whiteboard driver 154. In a step 204 the received data, which may be termed board data, is converted into a proprietary format, to create so-called private data.

In a step 206 the private data is routed to the board input interface 190. In general the interactive whiteboard driver 154 and the mouse driver 156 may generate their output data on a shared data bus, and identifiers within the data packets may be used to determine whether to route the data packets to the board input interface 190 or the mouse input interface 158.

In a step 208 the board input interface 190 routes the private data to the applications within the first set of applications 196.

In a step 210 it is determined whether mouse data is available on the mouse data bus 176 for one or more of the applications within the first set of applications 196. If mouse data is available for one of these applications, then in a step 216 the mouse data is processed as a priority over the private data. In such case the input focus of the operating system switches to the application within the first set of applications 196. Mouse data will be available when the user of the mouse 120 has initiated an event associated with an application running on the interactive whiteboard 106.

If mouse data is not available for the application in step 210, then in a step 212 the private data is processed at one or more applications within the first group of applications 196.

After either step 212 or 216, the displayed images projected onto the surface of the interactive whiteboard 106 are updated via the board graphics driver 168.

Figure 5:
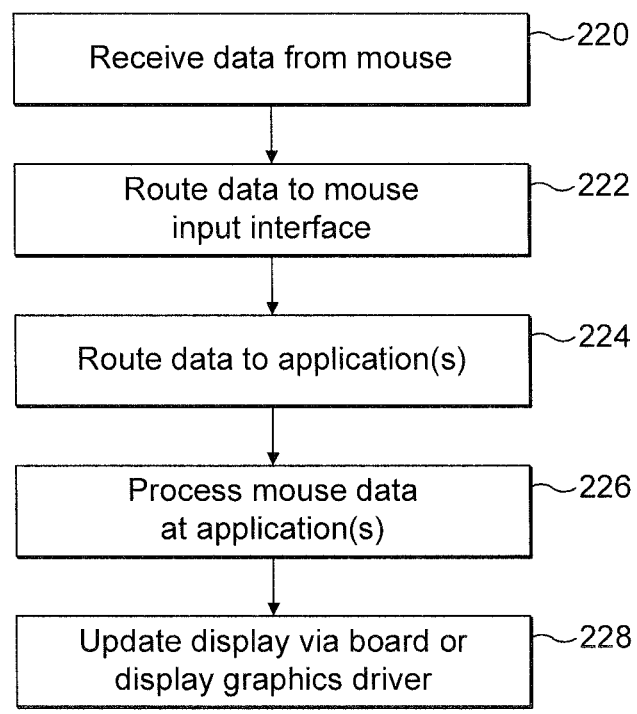
FIG. 5 illustrates a flow process for processing input data received from a mouse in the interactive display system according to the preferred embodiment of the invention.

In FIG. 5 there is illustrated the process flow for processing data received via the mouse.

In a step 220 data is received from the mouse 120 at the mouse driver 156. In a step 222 the received mouse data is routed to the mouse input interface 158. In a step 224 the mouse data is routed by the mouse input interface 158 on mouse data bus 176.

In general, therefore, inputs from the interactive display surface do not affect the input focus of the operating system. The input focus of the operating system is retained by the one or more applications of the second set of applications, which can be considered to be a set of possible (or candidate) foreground applications. A current foreground application is determined solely in dependence on the inputs from the one or more further input devices.

The one or more applications of the first set of applications operate as applications under the control of inputs from the interactive display surface. Inputs from the interactive display surface do not interrupt the input focus of the operating system.

One or more of the first set of background applications may become a foreground application in dependence on an input from the one or more further input devices. For example if an input from the one or more further input devices is for one of the first set of applications, then that application may become a foreground application. However an application of the first set of applications cannot become a foreground application under the control of an input from the interactive display surface.

Whilst in general reference is made to a first set of applications and a second set of application, such sets may include a single application or more than one applications. One or more images associated with an application of the first set may be displayed on the interactive display surface. One or more images associated with an application of the second set may be displayed on the further display.

It should be noted that in the above description of exemplary embodiments, reference to a mouse input is representative of an input distinct from the interactive surface input. In general, the computer system is adapted to receive inputs from an interactive display surface and one or more further input devices. A mouse is an example of a further input device. Other examples of further input devices include a keyboard, or another interactive display surface—such as a digitiser—connected to provide inputs to the computer system. Similarly the term mouse data is representative of input data provided by a mouse input, but in more general terms the one or more further inputs provide data in any format which is recognisable by the computer system and/or an operating system associated with the computer system.

The term private data refers to data which is to be directed to an application in such a way that it is not processed by the operating system in a conventional way. Private data is thus preferably data in a proprietary format. The header of packets of such data—or one or more bits in the header—may be set such that an application adapted to process such data may recognise that data, but other applications ignore it. Other ways of delivering so-called private data may be provided, such as including the address of particular applications in the header. The term private data in general refers to data which is recognisable as not being mouse data, or more generally not being data associated with a further input device. Private data may refer to any data received from the interactive surface.

As noted above, the mouse data on a mouse data bus 176 may be associated with one of the applications of the first group 196, or one of the applications of the second group 198. The application for which the mouse data is associated then processes the mouse data in a step 226. In a step 228 the displayed images are then updated via either the board graphics driver 168 or the display graphics driver 170, in accordance with whether the mouse data was associated with an application of the first group 196 or the second group 160. In this way either the display images on the interactive whiteboard surface or the display 116 are updated.

The methods described herein may be implemented on computer software running on a computer system. The invention may therefore be embodied as a computer program code being executed under the control of a processor of a computer system. The computer program code may be stored on a computer program product. A computer program product may be included in a computer memory, a portable disk or portable storage memory, or hard disk memory.

The invention is described herein in the context of its application to a computer system forming part of an interactive display system. It will be understood by one skilled in the art that the principles of the invention, and embodiments described herein, are not limited to any specific interactive display system. The principles of the invention and its embodiments may be implemented in any interactive display system. The invention and its embodiments is not limited to the use of a pointer or pointing device in combination with an interactive display system, and the invention and its embodiments equally apply to arrangements in which a touch-sensitive touch surface arrangement is provided for the interactive display, or any other type of interactive surface is provided such as one utilising camera technology.

The invention has been described herein by way of reference to particular examples and exemplary embodiments. One skilled in the art will appreciate that the invention is not limited to the details of the specific examples and exemplary embodiments set forth. Numerous other embodiments may be envisaged without departing from the scope of the invention, which is defined by the appended claims.

What is claimed is:

1. A method of controlling a computing device being associated with an interactive display surface and a further display surface together forming a contiguous desktop display for the computing device, the method comprising:
   running an application at the computing device for display on the interactive display surface;
   receiving, at the computing device, board input data from the interactive display surface;
   running a separate application at the computing device for display on the further display;
   receiving, at the computing device, mouse input data from one or more other input devices, which mouse data is not received at the interactive display surface;
   determining a current foreground application of the computing device solely in dependence upon the mouse data from the one or more other input devices,
   wherein any board input data from the interactive display surface does not affect the determination of the foreground application of the computing device such that any board input data from the interactive display surface does not interrupt the input focus of the operating system of the computing device, and wherein an application cannot become a foreground application of the computing device under the control of any board input data from the interactive display surface.

2. The method of claim 1 further comprising, at the computing device, routing the board input data from the interactive display surface to one or more applications.

3. The method of claim 2, wherein the step of routing the board input data received from the interactive display surface comprises converting the data into a proprietary format.

4. The method of claim 3 wherein the one or more applications are adapted to process the board input data in the proprietary format.

5. The method of claim 2 wherein any background application receiving board input data from the interactive display surface is maintained as a background application.

6. The method of claim 1 in which the board input data from the interactive display surface is thereby prevented from interrupting the mouse input data received from the one or more input devices.

7. The method of claim 1 in which an input focus of the computing device is thereby unaffected by the board input data from the interactive display system.

8. A non-transitory computer-readable medium for storing a computer program code which, when run on a computing device, performs the method steps of claim 1.

9. A computing device adapted to display one or more images on an interactive display surface and to display one or more images on a further display, the computing device being further adapted to receive board input data from the interactive display surface and mouse input data from one or more further input devices, mouse input data from the one or more further input devices not being received at the interactive display surface, the computing device being adapted to run an application at the computing device for display on the interactive display surface and to run a separate application at the computing device for display on the further display, the computing device being further adapted to determine a current foreground application solely in dependence upon the mouse input data received from the one or more further input devices, and to make said determination independent of any board input data received from the interactive display surface such that any board input data from the interactive display surface does not interrupt the input focus of the operating system, and wherein an application cannot become a foreground application under the control of any board input data from the interactive display surface.

10. The computing device of claim 9 further adapted such that any application receiving board input data from the interactive display surface is maintained as a background application.

11. The computing device of claim 9 further adapted such that one or more images displayed on the interactive display surface are associated with the one or more applications.

12. The computing device of claim 9 further adapted to control the one or more background applications using the interactive display surface.

13. The computing device of claim 9 further adapted to route the mouse input data from the one or more input devices to one or more possible foreground applications.

14. The computing device of claim 13 further adapted such that one or more images displayed on the further display are associated with the one or more possible foreground applications.

15. The computing device of claim 13 further adapted such that the one of the one or more possible foreground applications with which the mouse input data from the one or more input devices is associated is determined to be the foreground application.

16. The computing device of claim 9 wherein the interactive display surface is a display surface of a projection system and the further display is a display of the computing device.

17. The computing device of claim 9 wherein there is further provided a pointing device, the interactive display surface being adapted to detect the presence and position of the pointing device on the interactive surface.

18. The computing device of claim 17 wherein the interactive display surface is a touch sensitive surface and the pointing device is a finger.

19. The computing device of claim 9 wherein the interactive display surface is adapted to control a first set of software applications and the one or more further input devices are adapted to control a second set of software applications.

* * * * *